United States Patent [19]

Ito et al.

[11] 4,409,506

[45] Oct. 11, 1983

[54] INDUCTION MOTOR

[75] Inventors: Motoya Ito; Noboru Fujimoto; Noriyoshi Takahashi; Masatoshi Watanabe, all of Hitachi; Seizi Yamashita, Katsuta, all of Japan

[73] Assignee: Hitachi, Ltd., Tokyo, Japan

[21] Appl. No.: 286,841

[22] Filed: Jul. 27, 1981

[30] Foreign Application Priority Data

Jul. 28, 1980 [JP] Japan ............................... 55-102362

[51] Int. Cl.$^3$ ........................ H02K 1/22; H02K 17/00
[52] U.S. Cl. ..................................... 310/166; 310/261
[58] Field of Search ............... 310/261, 262, 264–266, 310/211, 210, 212, 271, 166–168

[56] References Cited

U.S. PATENT DOCUMENTS

| 2,372,590 | 3/1945 | Ljunggren et al. | 310/211 |
| 2,492,678 | 12/1949 | Amtsberg | 310/266 |
| 3,068,373 | 12/1962 | Bekey | 310/261 X |
| 4,282,451 | 8/1981 | Bratoljic | 310/261 X |

FOREIGN PATENT DOCUMENTS

| 74544 | 4/1894 | Fed. Rep. of Germany | 310/210 |
| 151637 | 7/1955 | Sweden | 310/210 |
| 183845 | 8/1923 | United Kingdom | 310/211 |
| 266780 | 3/1927 | United Kingdom | 310/210 |
| 1436191 | 5/1976 | United Kingdom | 310/261 |

OTHER PUBLICATIONS

Dorairaj et al., *Polyphase Induction Machine... Slipmeter*, IEEE Transactions on Power App. & Sys. (vol. PAS-86, No. 7, Jul., 1967), pp. 835-843.

Primary Examiner—John Gonzales
Attorney, Agent, or Firm—Antonelli, Terry & Wands

[57]  ABSTRACT

When an induction motor is speed-controlled with a variable frequency power supply including thyristor inverters, operating loss due to harmonics components is increased in a rotor of the induction motor. In order to diverge additional operating loss into an appreciable depth of the rotor to thereby suppress the increase in the operating loss, the rotor comprises a cylindrical member having a circumferential resistivity which is larger than axial and radial resistivities and circumferential permeability which is smaller than axial and radial permeabilities, and a core disposed in the cylindrical member and having an axial permeability which is smaller than circumferential and radial permeabilities.

20 Claims, 16 Drawing Figures

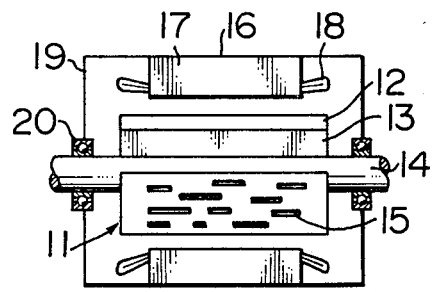
FIG.1
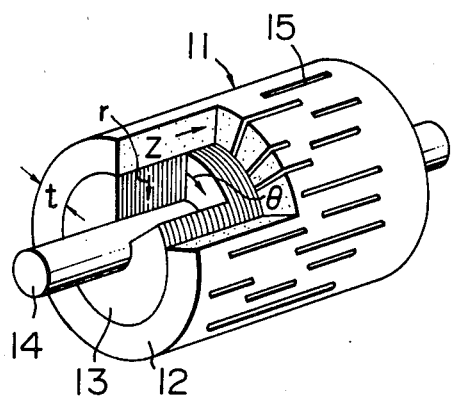
FIG.2
FIG.3a
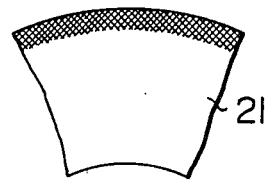
FIG.3b
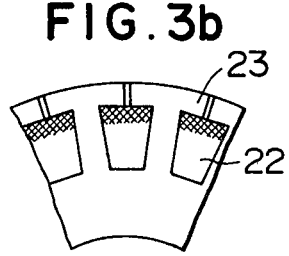
FIG.3c
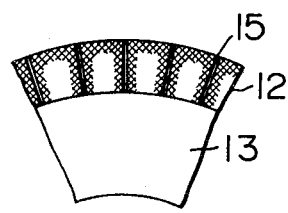
FIG.4
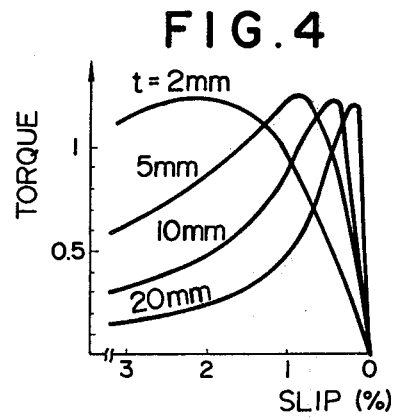
FIG.5
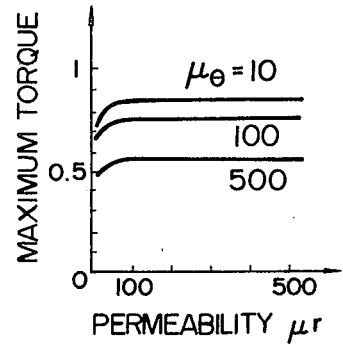

INDUCTION MOTOR

BACKGROUND OF THE INVENTION

This invention relates to induction motors and more particularly to an induction motor having a rotor capable of reducing operating loss due to distorted alternating current when driven by a non-sinusoidal power supply such as a power supply including inverters and the like.

Generally, from the standpoint of the difference in the rotor structure, induction motors are classified into three major types, namely, a wound-rotor induction motor having a rotor core formed with slots in which rotor windings are seated, a squirrel-cage induction motor having a similar rotor core formed with slots in which conductors put together in a squirrel-cage configuration are seated, and a solid rotor induction motor having a rotor core which acts by itself as a winding or which has conductors secured to its overall surface. Among these induction motors, the squirrel-cage induction motor having a squirrel-cage rotor of excellent electrical characteristics which is robust and relatively inexpensive is typical and used in most fields.

In the squirrel-cage rotor, a rotor core of laminated thin iron sheets is fixedly secured to a rotary shaft. Grooved in the circumferential surface of the rotor are a plurality of slots which extend axially and open to the surface, the slots being spaced circumferentially from each other by an identical distance. Conductor bars of copper or aluminum are then inserted in the slots and short-circuited by short-circuiting rings as applied to opposite ends of the rotor. The squirrel-cage rotor of the above structure is inserted into a stator and supported therein with an air gap therebetween to complete the induction motor. In the induction motor, rotating field generated in the stator induces electromotive forces in the conductor bars, thus causing current flow in the conductor bars. The current flow interacts with the rotating field to rotate the rotor. When the induction motor is driven approximately under ratings with a typical sine-wave power supply, magnetic flux incident upon the rotor has a very small frequency of several Hz so that the current flow in the conductor bars is uniform and hence the squirrel-cage rotor can be operated with safety under stable thermal conditions.

Currently, however, a variable frequency power supply including thyristor inverters and the like has been used for speed control of the squirrel-cage induction motor. The output of the variable frequency power supply is in general a distorted alternating current which contains harmonics components. Accordingly, the magnetic flux generated in the stator contains a variety of time-variant harmonics and, in the squirrel-cage rotor in operation, additional loss due to the harmonics components is caused. Disadvantageously, loss in the squirrel-cage rotor is considerably increased when the motor is driven by the distorted waveform as compared when driven by sine-wave alternating current.

One may refer to IEEE TRANSACTIONS ON POWER APPARATUS AND SYSTEMS (Vol. PAS-86, No. 7 JULY 1967) "Polyphase Induction Machine with Slitted Ferromagnetic Rotor: I—Experimental Investigations and a Novel Slipmeter" disclosing an induction motor with a slitted rotor. This publication simply describes change in the position of slits and corresponding characteristics of the induction motor.

SUMMARY OF THE INVENTION

This invention contemplates elimination of the above drawbacks and has for its object to provide an induction motor capable of reducing loss when operated with distorted alternating current.

Thus, the invention is based on such an analysis that the operating additional loss due to distorted alternating current is mainly concentrated to the rotor surface and its density can be reduced by diverging the additional loss into an appreciable depth of the rotor. According to the invention, the above object can be accomplished by an induction motor having a rotor which comprises a cylindrical member having a circumferential resistivity which is larger than axial and radial resistivities and a circumferential permeability which is smaller than axial and radial permeabilities, and a core disposed in the cylindrical member and having an axial permeability which is smaller than circumferential and radial permeabilities.

BRIEF DESCRIPTION OF THE DRAWINGS

FIG. 1 is a longitudinal sectional view showing one embodiment of an induction motor according to the invention.

FIG. 2 is a perspective view, partly exploded, of a rotor used in the embodiment shown in FIG. 1.

FIGS. 3a to 3c are diagrams useful in explaining distributions of eddy current generated in various types of rotor.

FIG. 4 is a graph showing variations in torque characteristics with a parameter of the wall thickness of a cylindrical member used in the induction motor according to the invention.

FIG. 5 is a graph showing variations in maximum torque obtained when circumferential and radial permeabilities of the cylindrical member are varied.

DESCRIPTION OF THE PREFERRED EMBODIMENTS

Figure 6:
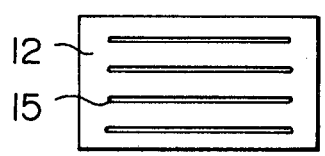
FIGS. 6 through 11 are plan views showing various modified embodiments of the cylindrical member used in the induction motor according to the invention.

The invention will now be described by way of example with reference to the drawings.

FIG. 1 shows an induction motor embodying the the invention, and FIG. 2 shows a rotor used in the induction motor.

In the illustrated embodiment, a rotor 11 comprises a cylindrical member 12, a core 13 disposed in the cylindrical member 12, and a rotary shaft 14 passing through the center axis of the core 3.

The cylindrical member is made of a material having a small resistivity, i.e., high conductivity and a large permeability, such a material being, for example, cobalt family iron alloy or copper-iron alloy. Formed in the cylindrical member, except axial opposite ends, are a majority of slits 15 which are elongated in an axial direction Z, having different axial lengths. Adjacent slits 15 are spaced irregularly in the axial and circumferential directions Z and $\theta$. On the other hand, the core 13 is formed by a plurality of magnetic thin circular iron sheets laminated in the axial direction Z, and is robustly fitted with the cylindrical member 12 and the rotary shaft 14 by, for example, shrink fit for integration therewith.

Similar to an ordinary induction motor, a stator 16 having a stator core 17 and a winding 18 wound thereon is fixed to a casing 19 which supports bearings 20. The rotor 11 is rotatably supported by the bearings 20 inside the stator 17 with a predetermined gap between the rotor and the stator.

Incidentally, without the slits 15, the cylindrical member 12 would have identical circumferential resistivity $\rho_\theta$, axial resistivity $\rho_Z$ and radial resistivity $\rho_r$ and identical circumferential permeability $\mu_\theta$, axial permeability $\mu_Z$ and radial permeability $\mu_r$. Under the formation of the majority of slits 15 in the axial direction Z, however, circumferential current and flux are suppressed and thus the cylindrical member 12 has equivalent resistivities and permeabilities which satisfy $\rho_Z < \rho_r < < \rho_\theta$ and $\mu_Z > \mu_r > > \mu_\theta$. And, at axial opposite ends of the cylindrical member 12 removed of the slits 15, $\rho_Z = \rho_r = \rho_\theta$ and $\mu_Z = \mu_r = \mu_\theta$ hold. On the other hand, the core 13 formed by the plurality of axially laminated thin steel sheets has an axial resistivity $\rho'_Z$ which is far larger than its circumferential and radial resistivities $\rho'_\theta$ and $\rho'_r$, thus suppressing axial current, and has an axial permeability $\mu'_Z$ which is far smaller than its circumferential and radial permeabilities $\mu'_\theta$ and $\mu'_4$, suppressing axial flux.

The rotor 11 of the above structure in accordance with the embodiment described herein has electrical properties compatible with those of a conventional squirrel-cage rotor. More particularly, as described hereinbefore, the structure of the conventional squirrel-cage rotor is such that its core of laminated thin steel sheets has axial slots grooved in the circumferential surface, conductor bars are mounted in the slots and opposite ends of the conductor bars are short-circuited by short-circuiting rings. Accordingly, assuming that facial neighbourhood of the core in which the conductor bars are mounted substitutes for the cylindrical member 12, the short-circuiting rings substitute for the axial opposite ends of the cylindrical member 12 and the interior plenum of the core substitutes for the core 13, the rotor 11 of the illustrated embodiment is electrically equivalent to the squirrel-cage rotor.

For this reason, the induction motor of the foregoing embodiment, when driven by a sinusolidal waveform alternating current, can achieve highly efficient electrical characteristics like ordinary squirrel-cage induction motors can.

However, under the operation with a distorted alternating current generated by inverters and the like, voltage and current contain a variety of time-variant harmonics of higher order and it follows that rotating magnetic field generated by the stator 16 also contain harmonics of higher order. As a result, magnetic flux incident upon the rotor 11 contains harmonics components of higher order to induce eddy currents in the cylindrical member 12, resulting in generation of eddy current loss. This loss is a major part of an additional loss caused under the operation with the distorted alternating current.

Eddy current subject to skin effect flows through facial neighbourhood of a conductor having a depth, i.e., a skin depth $\delta$ which is well known as:

$$\delta = \sqrt{\frac{2\rho}{\mu\omega}}$$

where $\rho$ is resistivity, $\mu$ is permeability that is $\mu'_\theta$ in the foregoing embodiment, and $\omega$ is angular frequency that amounts to several KHz under the operation with an ordinary power supply including inverters.

From the standpoint of this phenomenon, an analysis is conducted on current distributions to be generated in various types of rotor. Results are shown in FIGS. 3a to 3c, in which hatching represents current flow region or regions. In a small current flow region, concentration of eddy currents occurs to increase the density of a loss which is in square proportion to the eddy currents, resulting in an increased loss. Conversely, in a large current flow region, divergence of eddy currents occurs to decrease the loss density, resulting in a decreased loss.

FIG. 3a shows a current distribution in a solid rotor. In a solid rotor 21 made of a lump of an isotropic material having large conductivity and permeability, extreme concentration of eddy currents takes place in the rotor surface region and an extremely large loss results.

FIG. 3b shows a current distribution in a squirrel-cage rotor. In the squirrel-cage rotor, eddy currents are concentrated in heads of conductor bars 22. In other words, a rotor core 23 is exclusively used as a flux path and little affected by the flow of eddy currents so that the eddy current flow is confined to the conductor bars 22.

FIG. 3c shows a current distribution in the embodiment of the present invention. In this rotor, the flow of eddy current, diverges not only to the surface region of the cylindrical member 12 but also to walls of the slits 15. Thus, with this rotor having an internal region for the diverged eddy currents to flow which is larger than that of the solid or squirrel-cage rotor, concentration of eddy currents is reduced to decrease the density of loss, resulting in a decreased eddy current loss. Consequently, it is possible to materialize an induction motor which can operate with high efficiency even when driven by a distorted alternating current.

In the rotor 11 of the induction motor according to the foregoing embodiment, thickness t and equivalent circumferential permeability $\mu_\theta$ of the cylindrical member 12 are selected properly as described below.

FIG. 4 shows the relation between the thickness t of the cylindrical member 12 and torque characteristics. As will be seen from FIG. 4, torque characteristics vary with a parameter of the thickness t of the cylindrical member 12 which takes a value of 2 mm, 5 mm, 10 mm or 20 mm. Accordingly, by selecting a proper value of the thickness t of the cylindrical member 12 in compliance with characteristics of a load or inverters, desired torque characteristics can be obtained.

FIG. 5 shows the relation between the maximum torque and the equivalent radial permeability $\mu_r$ of the cylindrical member 12 varying with a parameter of the equivalent circumferential permeability $\mu_\theta$ of the cylindrical member 12. The level of maximum torque increases as the circumferential permeability $\mu_\theta$ decreases. Below a circumferential permeability of about 100, change of the level of maximum torque is not so great. Accordingly, the arrangement of slits responsible for determination of $\mu_\theta$ can be selected with a relatively great freedom.

Thus, the induction motor of the invention can insure a design tolerance comparable to that of the ordinary squirrel-cage induction motor.

FIGS. 6, 7, 8 and 9 show modified arrangements of the slits 15 formed in the cylindrical member 12. Since, in general, the slits 15 are required to be arranged so as to provide the cylindrical member 12 with the electromagnetic characteristics represented by $\rho_z < \rho_r < < \rho_\theta$ and $\mu_z > \mu_r > > \mu_\theta$ for increase of the eddy current flow region, various arrangements are conceivable.

In FIG. 6, the slits 15 are elongated equally in the axial direction and spaced equally in the circumferential direction.

Figure 7:
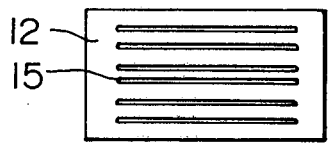

In FIG. 7, the slits 15 are elongated equally in the axial direction and spaced unequally in the circumferential direction.

Figure 8:
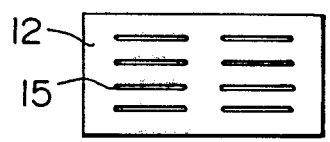
Figure 9:
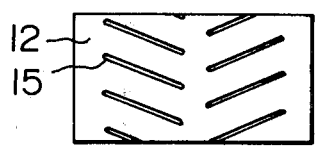

In FIG. 8, the cylindrical member 12 has an intermediate zone removed of the slits 15 for improvement of mechanical strength. Specifically, two groups of a plurality of slits 15 which are equally elongated in the axial direction and equally spaced in the circumferential direction are formed in the cylindrical member 12 with interposition of the intermediate zone removed of the slits between the two groups. In FIG. 9, the slits 15 as shown in FIG. 8 are arranged obliquely to thereby attain an effect similar to skew effect in the squirrel-cage rotor.

Figure 10:
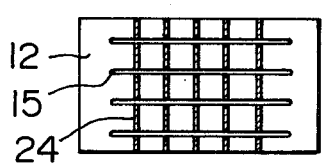

In FIG. 10, the slits 15 formed in the cylindrical member 12 intersect a plurality of circumferential shallow grooves 24 which are spaced equally in the axial direction. This arrangement can promote reduction of loss generated in the surface region of the cylindrical member 12.

Figure 11:
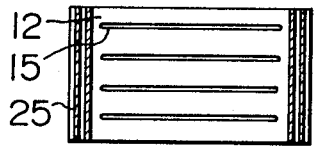

In FIG. 11, relatively deep circumferential grooves 25 are formed in the cylindrical member 12 at its opposite ends removed of the slits 15 to provide current paths corresponding to the short-circuiting rings of the squirrel-cage rotor.

Figure 12:
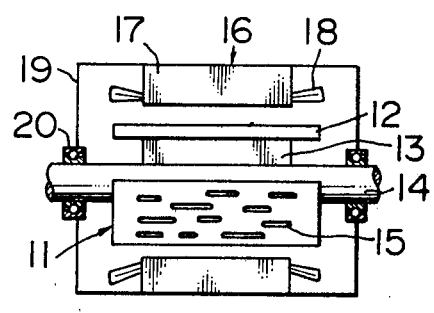
FIGS. 12 through 14 are longitudinal sectional views showing further embodiments of the induction motor according to the invention.
Figure 13:
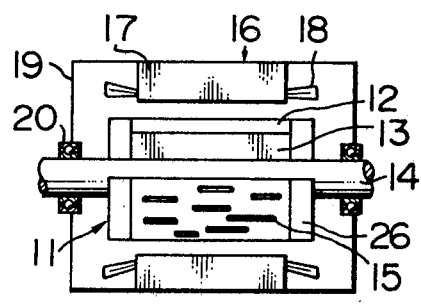
Figure 14:
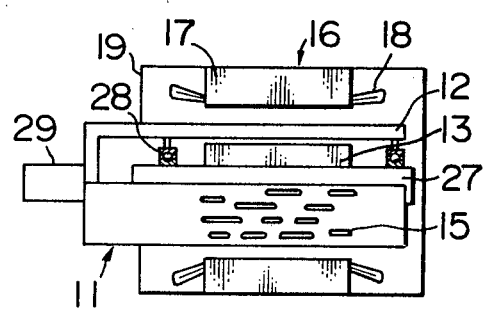

FIGS. 12, 13 and 14 illustrate further embodiments of the invention. In these figures, the same elements as those in FIG. 1 are designated by the same reference numerals and only different elements from FIG. 1 will be described.

In an embodiment shown in FIG. 12, a core 13 has an axial length which comes short of opposite ends of a cylindrical member 12 so that a stator core 17 exactly opposes the core 13 and the opposite ends of the cylindrical member 12 axially project from those of the core 13. This arrangement is sufficient for the intended purpose.

In an embodiment shown in FIG. 13, clamp rings 26 are provided at opposite ends of a cylindrical member 12 and of a core 13 for clamping them. The clamping ring 26 may be made of a conductive material for use as a short-circuiting ring.

FIG. 14 illustrates a still further embodiment of the invention. This embodiment comprises a cylindrical member 12 with an internal cavity, and a core 13 supported in the cylindrical member 12 with a predetermined gap therebetween by being fitted on a stator shaft 27 fixedly secured to a stator. The core 13 has an axial permeability which is smaller than circumferential and radial permeabilities. On the other hand, the cylindrical member 12 is rotatably supported by the stator shaft 27 through bearing 28. A rotary shaft 29 is fixedly secured to the cylindrical member 12 to rotate the cylindrical member 12 alone. This cylindrical member 12 has of course a circumferential resistivity which is larger than axial and radial resistivities and a circumferential permeability which is smaller than axial and radial permeabilities. With the FIG. 14 arrangement, the effects as obtained in the foregoing embodiments can be attained.

In the embodiments as described hereinbefore, the slits 15 extend radially to pass through the wall of the cylindrical member 12 but they may simply be recessed in the cylindrical member 12 without passing through the wall thereof.

As described above, the induction motor of the invention has the rotor which comprises the cylindrical member having a circumferential resistivity which is larger than than axial and radial resistivities and a circumferential permeability which is smaller than axial and radial permeabilities, and the core disposed in the cylindrical member and having an axial permeability which is smaller than circumferential and radial permeabilities. The induction motor with the rotor of the above construction can operate with a minimum loss even when it is driven with a distorted alternating current fed from inverters or the like since additional operating loss due to the distorted alternating current can be diverged into the appreciable depth of the rotor.

What is claimed is:

1. An induction motor comprising a stator having a stator core applied with a winding for generating a rotating magnetic field, and a rotor opposing the stator with a predetermined gap therebetween and rotating under the influence of the rotating magnetic field generated by the stator, said rotor including a core fitted to a rotor shaft and a cylindrical member covering the circumferential surface of the core, said cylindrical member being formed with a plurality of slits, each of said slits being elongated axially and extending through the cylindrical member in a radial direction thereof to the circumferential surface of said core.

2. An induction motor according to claim 1, wherein said plurality of slits are formed over the entire circumferential area of said cylindrical member except at the opposite end portions extending in the axial direction, and said core is formed by a plurality of magnetic thin sheets which are laminated axially.

3. An induction motor according to claim 1, wherein said slits have irregular axial lengths and adjacent slits are spaced from each other by irregular distances in the axial and circumferential directions.

4. An induction motor according to claim 1, wherein said slits have the same axial length and are equally spaced from one another in the circumferential direction.

5. An induction motor according to claim 1, wherein said slits have the same axial length and are unequally spaced from one another in the circumferential direction.

6. An induction motor according to claim 1, wherein said slits are formed into two groups extending in the axial direction with a predetermined distance therebetween, each of said groups having a plurality of slits of the same axial length which are aligned in the circumferential direction and which are spaced equally from one another in the circumferential direction.

7. An induction motor according to claim 6, wherein said slits are extended obliquely with respect to the axial direction.

8. An induction motor according to claim 1, wherein said core is formed by a plurality of magnetic thin sheets which are laminated axially, said plurality of slits being formed over the entire circumferential area of said cylindrical member except at the opposite end portions extending in the axial direction, each of said slits having the same axial length and being spaced equally from one another in the circumferential direction, and a plurality of circumferential grooves extending in the circumferential direction and spaced equally from one another in the axial direction being provided so as to intersect said slits.

9. An induction motor according to claim 2, wherein said slits have irregular axial lengths and adjacent slits are spaced from each other by irregular distances in the axial and circumferential directions.

10. An induction motor according to claim 2, wherein said slits have the same axial length and are equally spaced from one another in the circumferential direction.

11. An induction motor according to claim 2, wherein said slits have the same axial length and are unequally spaced from one another in the circumferential direction.

12. An induction motor according to claim 2, wherein said slits are formed into two groups extending in the axial direction with a predetermined distance therebetween, each of said groups having a plurality of slits of the same axial length which are aligned in the circumferential direction and which are spaced equally from one another in the circumferential direction.

13. An induction motor according to claim 12, wherein said slits are extended obliquely with respect to the axial direction.

14. An induction motor comprising a stator having a stator core applied with a winding for generating a rotating magnetic field, and a rotor opposing the stator with a predetermined gap therebetween and rotating under the influence of the rotating magnetic field generated by the stator, said rotor including a core fitted to a rotor shaft and a cylindrical member covering the circumferential surface of the core, said cylindrical member including means for reducing eddy current loss when the induction motor is operated with a distorted alternating current, said means for reducing including a plurality of axially elongated slits formed in said cylindrical member so as to extend through said cylindrical member in a radial direction thereof to the circumferential surface of said core whereby eddy currents are diverged through said slits of said cylindrical member during operation of the induction motor.

15. An induction motor according to claim 14, wherein said plurality of slits are formed over the entire circumferential area of said cylindrical member except at the opposite end portions extending in the axial direction, and said core is formed by a plurality of magnetic thin sheets which are laminated axially.

16. An induction motor according to claim 14, wherein said slits have irregular axial lengths and adjacent slits are spaced from each other by irregular distances in the axial and circumferential directions.

17. An induction motor according to claim 14, wherein said slits have the same axial length and are equally spaced from one another in the circumferential direction.

18. An induction motor according to claim 14, wherein said slits have the same axial length and are unequally spaced from one another in the circumferential direction.

19. An induction motor according to claim 14, wherein said slits are formed into two groups extending in the axial direction with a predetermined distance therebetween, each of said groups having a plurality of slits of the same axial length which are aligned in the circumferential direction and which are spaced equally from one another in the circumferential direction.

20. An induction motor according to claim 19, wherein said slits are extended obliquely with respect to the axial direction.

* * * * *